US012593015B2

(12) United States Patent
Lu

(10) Patent No.: US 12,593,015 B2
(45) Date of Patent: Mar. 31, 2026

(54) TEMPERATURE CONTROL MODULE AND TEMPERATURE CONTROL METHOD

(71) Applicant: Coretronic Corporation, Hsin-Chu (TW)

(72) Inventor: Cheng-Han Lu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/666,826

(22) Filed: May 17, 2024

(65) Prior Publication Data

US 2024/0406355 A1 Dec. 5, 2024

Related U.S. Application Data

(60) Provisional application No. 63/469,837, filed on May 31, 2023.

(30) Foreign Application Priority Data

Aug. 14, 2023 (CN) .......................... 202311016278.3

(51) Int. Cl.
*H04N 9/31* (2006.01)
(52) U.S. Cl.
CPC ......... *H04N 9/3144* (2013.01); *H04N 9/3182* (2013.01); *H04N 9/3194* (2013.01)
(58) Field of Classification Search
CPC ... H04N 9/3144; H04N 9/3182; H04N 9/3194
See application file for complete search history.

(56) References Cited

U.S. PATENT DOCUMENTS

| | | | | |
|---|---|---|---|---|
| 6,652,104 B2 * | 11/2003 | Nishida | ................ | H04N 9/3185 353/69 |
| 6,877,863 B2 * | 4/2005 | Wood | ................... | H04N 9/3185 353/42 |
| 7,070,283 B2 * | 7/2006 | Akutsu | .................... | H04N 5/74 353/30 |
| 7,182,466 B2 * | 2/2007 | Sunaga | .................... | H04N 5/74 353/69 |
| 7,270,421 B2 * | 9/2007 | Shinozaki | ............ | G03B 21/142 353/121 |

(Continued)

FOREIGN PATENT DOCUMENTS

| | | |
|---|---|---|
| CN | 110855962 | 2/2020 |
| CN | 113138520 | 7/2021 |
| CN | 115793362 | 3/2023 |

*Primary Examiner* — Michael B. Pierorazio
(74) *Attorney, Agent, or Firm* — JCIPRNET

(57) ABSTRACT

A temperature control module and a temperature control method, which are suitable for a projector. A thermal sensor is disposed on the projector and suitable for sensing the ambient temperature to generate an ambient temperature sensing signal. A cooling device is disposed on the projector and suitable for cooling a target element of the projector. When the projector is in a brightness adjustment mode, a control circuit generates a control signal to the cooling device according to the ambient temperature sensing signal from the thermal sensor and the brightness setting signal of the projector. The cooling device adjusts the temperature regulation operation performed on the target element according to the control signal.

20 Claims, 9 Drawing Sheets

(56)                References Cited

U.S. PATENT DOCUMENTS

| | | | | |
|---|---|---|---|---|
| 7,359,575 B2* | 4/2008 | Bassi | G06T 3/18 | 345/427 |
| 7,441,906 B1* | 10/2008 | Wang | G03B 21/14 | 353/121 |
| 7,782,387 B2* | 8/2010 | Azuma | H04N 25/68 | 359/662 |
| 10,859,898 B2* | 12/2020 | Hou | H04N 9/3194 | |
| 10,935,877 B2* | 3/2021 | Tsai | G03B 21/2053 | |
| 11,256,165 B2* | 2/2022 | Tsai | H04N 9/3144 | |
| 2002/0051095 A1* | 5/2002 | Su | H04N 9/3194 | 348/745 |
| 2002/0122161 A1* | 9/2002 | Nishida | H04N 9/3194 | 353/70 |
| 2003/0191836 A1* | 10/2003 | Murtha | H04L 67/02 | 709/224 |
| 2003/0210381 A1* | 11/2003 | Itaki | H04N 5/74 | 353/70 |
| 2004/0156024 A1* | 8/2004 | Matsuda | H04N 9/3185 | 353/70 |
| 2005/0046803 A1* | 3/2005 | Akutsu | H04N 5/74 | 353/69 |
| 2005/0073661 A1* | 4/2005 | Tamura | H04N 9/3194 | 353/70 |
| 2005/0151934 A1* | 7/2005 | Akutsu | G03B 21/147 | 353/69 |
| 2005/0237492 A1* | 10/2005 | Shinozaki | H04N 9/3185 | 353/69 |
| 2006/0098167 A1* | 5/2006 | Sato | G03B 21/26 | 353/35 |
| 2006/0203207 A1* | 9/2006 | Ikeda | H04N 9/3185 | 353/70 |
| 2007/0008344 A1* | 1/2007 | Medina | G06T 15/10 | 345/647 |
| 2007/0257941 A1* | 11/2007 | Plut | G06F 9/451 | 345/660 |
| 2007/0285626 A1* | 12/2007 | Miyasaka | G03B 21/206 | 353/85 |
| 2009/0278999 A1* | 11/2009 | Ofune | H04N 21/47 | 348/E3.048 |
| 2010/0002123 A1* | 1/2010 | Nozaki | H04N 23/00 | 348/E5.022 |
| 2010/0045942 A1* | 2/2010 | Furui | H04N 9/3194 | 353/69 |
| 2011/0085044 A1* | 4/2011 | Noda | G03B 21/58 | 348/E5.133 |
| 2011/0210979 A1* | 9/2011 | Furui | G03B 37/04 | 345/619 |
| 2011/0234994 A1* | 9/2011 | Uchiyama | H04N 9/3185 | 353/121 |
| 2011/0285971 A1* | 11/2011 | Oka | H04N 9/3185 | 353/70 |
| 2011/0292351 A1* | 12/2011 | Ishii | H04N 9/3185 | 353/69 |
| 2018/0158102 A1* | 6/2018 | Choi | G06Q 30/0251 | |
| 2019/0041731 A1* | 2/2019 | Katayama | H04N 9/3144 | |

* cited by examiner

| | Value |
|---|---|
| Brightness | (rpm max, i) = (rpm max, 1) + [(rpm max, 100) - (rpm max, 1)] * (i - 1) / 99 |
| | (rpm min, i) = (rpm min, 1) + [(rpm min, 100) - (rpm min, 1)] * (i - 1) / 99 |
| Ta (℃) | Ta < 28 ，Fan rotation speed= (rpm min, i) |
| | Ta = 28~40 ，Fan rotation speed= (rpm min, i) + G* (Ta - 28) |
| | Ta > 40 ，Fan rotation speed= (rpm max, i) |

FIG. 3

| Fan | MN1 | MX1 | MN2 | MX2 |
|---|---|---|---|---|
| F1 | 1000 x α | 1700 x α | 1500 x α | 4700 x α |
| F2 | 1000 x α | 1700 x α | 1500 x α | 4700 x α |
| F3 | 1350 x α | 3500 x α | 1500 x α | 3500 x α |
| F4 | 1350 x α | 3500 x α | 1500 x α | 3500 x α |
| F5 | 1350 x α | 3500 x α | 1500 x α | 3500 x α |

FIG. 4

| | | | Value | | | | |
|---|---|---|---|---|---|---|---|
| Ta (°C) | ≤36 | | | 37~41 | | | |
| Brightness | 1 | 100 | 1 | 100 | | i | 100 |
| Initial current of a thermoelectric cooler (TEC) (A) | | 2.5 | | | | | |
| Current range of the TEC (A) | 0.5~2.8 | | | | 0.5~2.8 | | |
| Target upper limit value (°C) | 54 | 40 | 54 | -0.14*i + 54 | | -0.08*i + 54 | 46 |
| Target lower limit value (°C) | 52 | 38 | 52 | -0.14*i + 52 | | -0.08*i + 52 | 44 |

FIG. 5

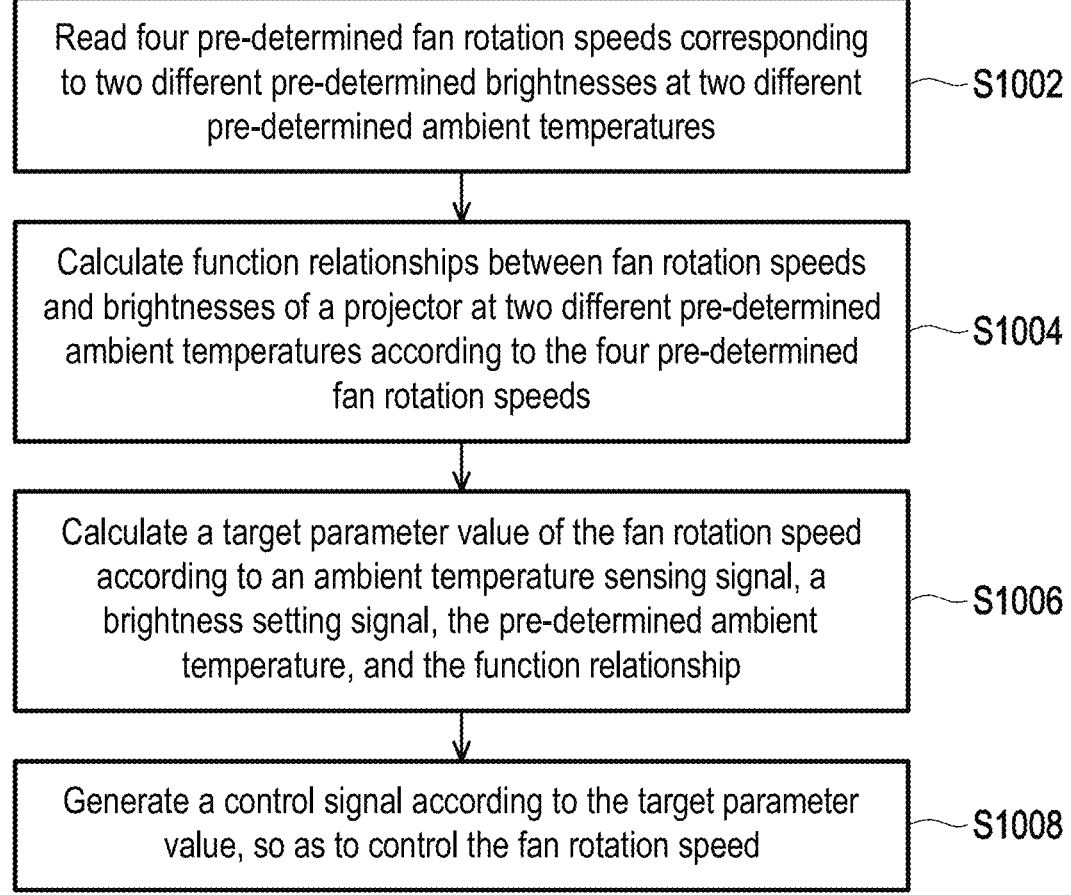

Read four pre-determined fan rotation speeds corresponding to two different pre-determined brightnesses at two different pre-determined ambient temperatures — S1002

Calculate function relationships between fan rotation speeds and brightnesses of a projector at two different pre-determined ambient temperatures according to the four pre-determined fan rotation speeds — S1004

Calculate a target parameter value of the fan rotation speed according to an ambient temperature sensing signal, a brightness setting signal, the pre-determined ambient temperature, and the function relationship — S1006

Generate a control signal according to the target parameter value, so as to control the fan rotation speed — S1008

FIG. 10

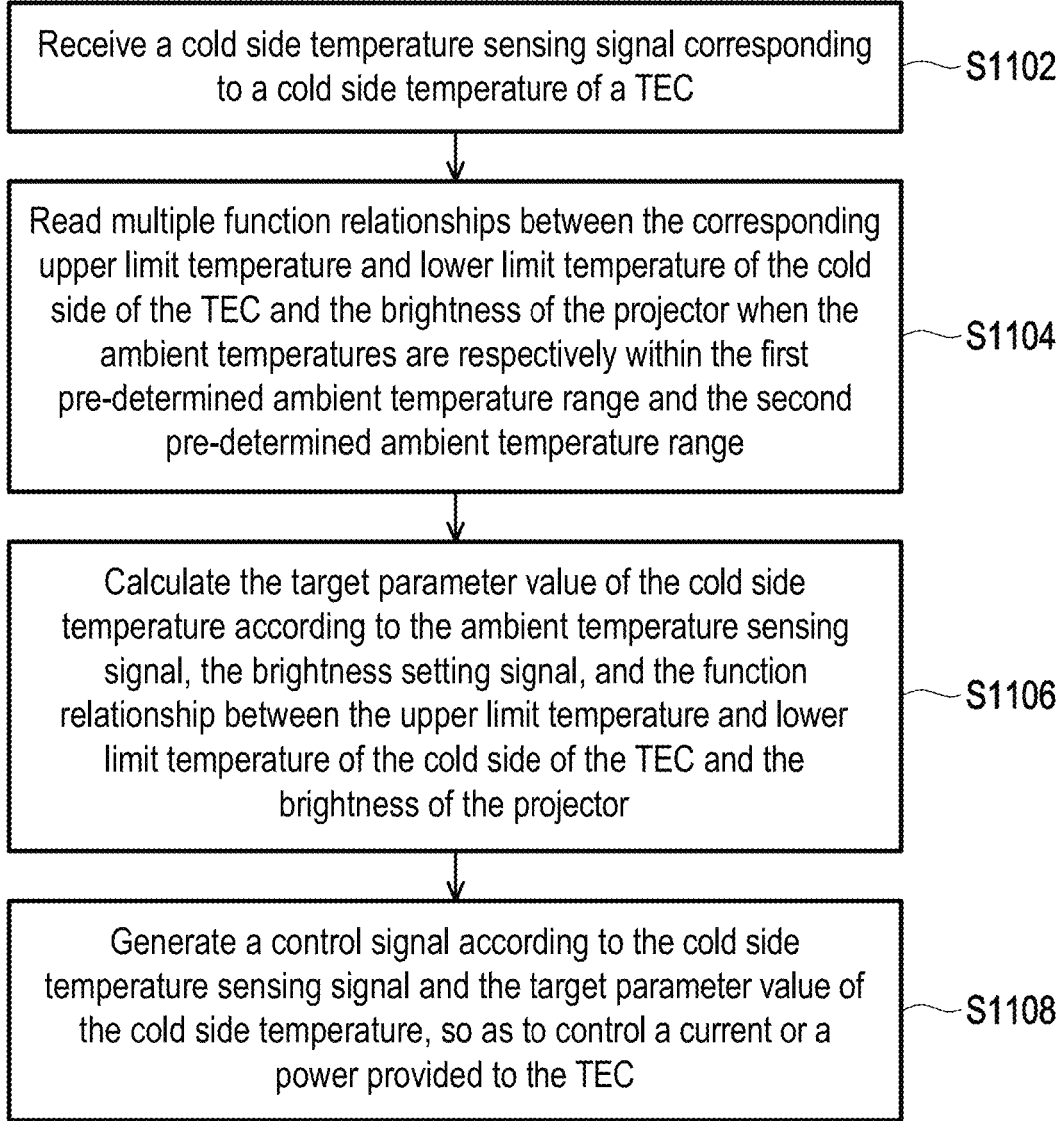

Receive a cold side temperature sensing signal corresponding to a cold side temperature of a TEC — S1102

Read multiple function relationships between the corresponding upper limit temperature and lower limit temperature of the cold side of the TEC and the brightness of the projector when the ambient temperatures are respectively within the first pre-determined ambient temperature range and the second pre-determined ambient temperature range — S1104

Calculate the target parameter value of the cold side temperature according to the ambient temperature sensing signal, the brightness setting signal, and the function relationship between the upper limit temperature and lower limit temperature of the cold side of the TEC and the brightness of the projector — S1106

Generate a control signal according to the cold side temperature sensing signal and the target parameter value of the cold side temperature, so as to control a current or a power provided to the TEC — S1108

FIG. 11

TEMPERATURE CONTROL MODULE AND TEMPERATURE CONTROL METHOD

CROSS-REFERENCE TO RELATED APPLICATION

This application claims the priority benefits of U.S. provisional application Ser. No. 63/469,837, filed on May 31, 2023, and China application serial no. 202311016278.3, filed on Aug. 14, 2023. The entirety of each of the above-mentioned patent applications is hereby incorporated by reference herein and made a part of this specification.

BACKGROUND

Technical Field

The disclosure relates to a temperature control module and a temperature control method.

Description of Related Art

Generally, the projector allows the user to adjust and change the brightness in the custom brightness mode. In order to avoid overheating of the components, the fan may be set to a Full mode with a fixed fan rotation speed, or an Eco mode of fan rotation speed which also takes account of the noise. If a thermoelectric cooler (TEC) is used in the projector, since the TEC contains opposite sides of a hot side and a cold side, the cold side is in contact with the heat source, and the hot side is cooled directly through the air flow generated by the fan, or by connecting a heat dissipation device (such as a heatsink) and then cooling the heat dissipation device through the air flow generated by the fan, so as to achieve the effect of heat dissipation from the heat source. Therefore, it is necessary to ensure that condensation does not occur to the TEC when the scenario is at the lowest brightness. For example, under low brightness conditions, the hot side temperature of the TEC is low. If the TEC driving current and fan rotation speed under high brightness conditions are still used to cool the hot side of the TEC, the temperature of the cold side of the TEC may drop below the dew point and condensation may occur, which may cause the projector to malfunction or even to be damaged.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

A temperature control module according to the disclosure is suitable for a projector. The temperature control module includes a thermal sensor, a cooling device, and a control circuit. The thermal sensor is disposed on the projector, and the thermal sensor is suitable for sensing the ambient temperature to generate an ambient temperature sensing signal. The cooling device is disposed on the projector and suitable for cooling a target element of the projector. The control circuit is coupled to the thermal sensor and the cooling device. When the projector is in the brightness adjustment mode, the control circuit generates a control signal to the cooling device according to the ambient temperature sensing signal from the thermal sensor and the brightness setting signal of the projector, and the cooling device adjusts the temperature regulation operation performed on the target element according to the control signal.

The disclosure also provides a temperature control method suitable for a projector, and the temperature control method includes the following steps. A selection signal of a brightness adjustment mode is received. An ambient temperature sensing signal and a brightness setting signal are received. A control signal is generated according to the ambient temperature sensing signal and the brightness setting signal. A cooling device is controlled according to the control signal, so as to adjust the temperature regulation operation performed on the target element of the projector. Whether to end the brightness adjustment mode is determined. The operation of receiving the ambient temperature sensing signal and the brightness setting signal is repeatedly returned to in response to the determination result being no, and the temperature control method is ended in response to the determination result being yes.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram of a fan rotation speed calculation table according to an embodiment of the disclosure.

FIG. 4 is a schematic diagram of a fan rotation speed control table according to an embodiment of the disclosure.

FIG. 5 is a schematic diagram of a temperature control point calculation table of a thermoelectric cooler according to an embodiment of the disclosure.

FIG. 10 is a flowchart of a fan rotation speed control method according to an embodiment of the disclosure.

FIG. 11 is a flowchart of a control method of the thermoelectric cooler according to an embodiment of the disclosure.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

This disclosure provides a temperature control module and a temperature control method that can prevent condensation from occurring, thereby preventing the projector from malfunctioning or being damaged.

Other purposes and advantages of the disclosure may be further understood from the technical features disclosed in the disclosure.

Figure 1:
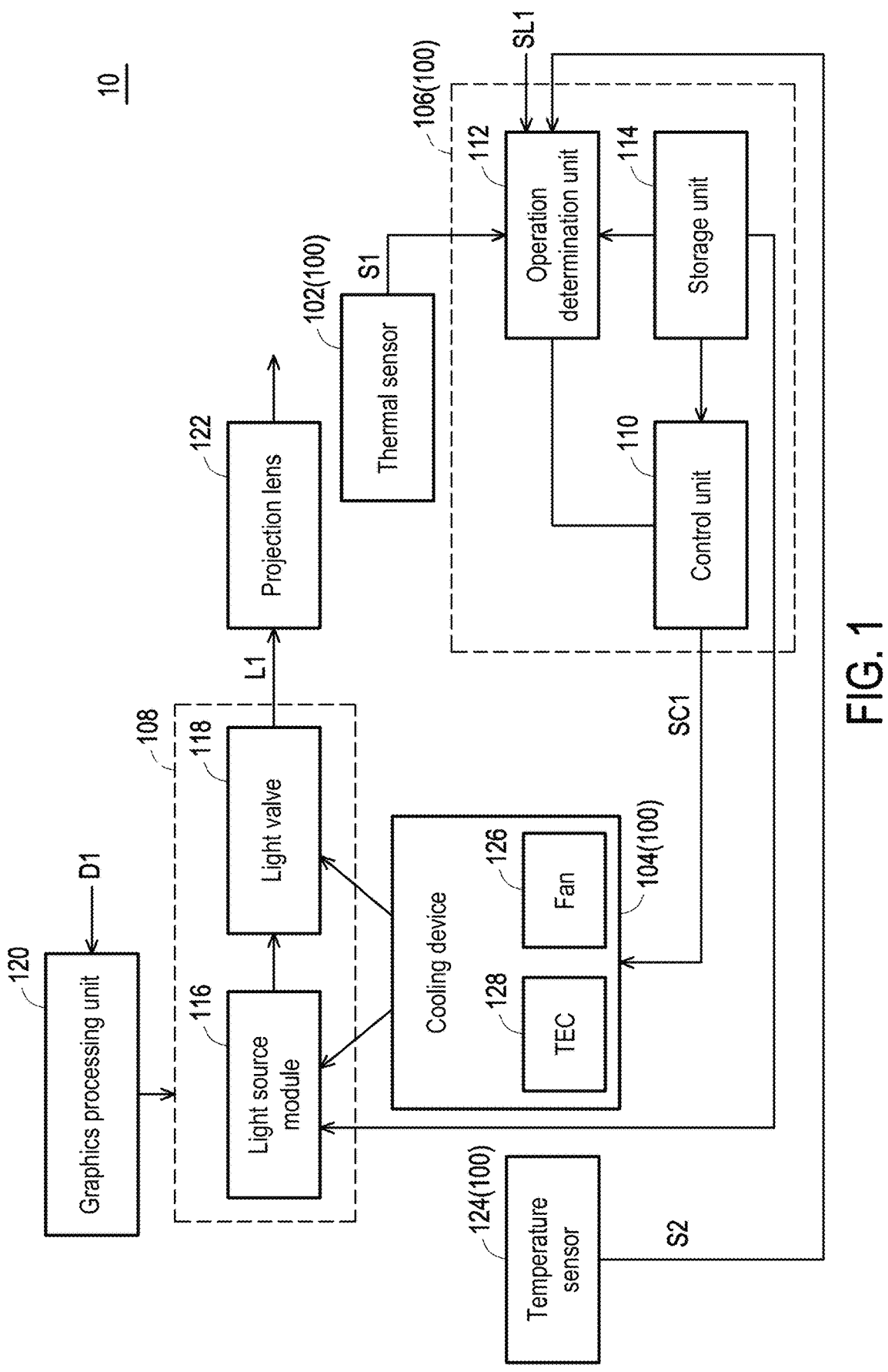
FIG. 1 is a schematic diagram of a projector having a temperature control module according to an embodiment of the disclosure.

FIG. 1 is a schematic diagram of a projector having a temperature control module according to an embodiment of the disclosure. Please refer to FIG. 1. A temperature control module 100 includes a thermal sensor 102, a cooling device 104, a control circuit 106, and a temperature sensor 124. The control circuit 106 is coupled to the thermal sensor 102, the cooling device 104, and the temperature sensor 124. It is worth noting that, in some embodiments, the temperature control module 100 may not include the temperature sensor 124, and the disclosure is not limited thereto. In addition, besides the temperature control module 100, a projector 10 may also include elements such as a light source module 116, a light valve 118, an graphics processing unit 120, and a projection lens 122. The graphics processing unit 120 is suitable for controlling the light source module 116 and the light valve 118, so that the illumination light beam provided by the light source module 116 passes through the light valve 118 to form an image light beam L1, and the image light beam L1 is projected to the projection screen through the projection lens 122. In this embodiment, the light source module 116 includes, for example, one or more laser light emitting elements. The illumination light beams provided by the light source module 116 include, for example, beams of different colors, but are not limited thereto. In this embodiment, the light valve 118 is, for example, a reflective light modulator such as a digital micro-mirror device (DMD) or a liquid crystal on silicon panel (LCoS panel). In some embodiments, the light valve 118 may be, for example, a transmissive light modulator such as a transmissive liquid crystal display panel, an electro-optical modulator, a maganeto-optic modulator, or an acousto-optic modulator (AOM), but is not limited thereto. In this embodiment, the projection lens 122 includes, for example, a combination of one or more reflective optical lens elements with diopters, such as various kinds of combination of biconcave lens elements, biconvex lens elements, concave-convex lens elements, convex-concave lens elements, plano-convex lens elements, and plano-concave lens elements. In an embodiment, the projection lens 122 may also include a plane optical lens element to project the image light beam L1 from the light valve 118 out of the projector 10 in a reflective or transmissive manner.

The thermal sensor 102 may be disposed at the air inlet of the projector 10 (not limited to being placed inside or outside the casing of the projector), but is not limited thereto. In other embodiments, it may also be placed, for example near the cooling device 104. The thermal sensor 102 is suitable for sensing the ambient temperature to generate an ambient temperature sensing signal S1, and the thermal sensor 102 may be implemented, for example, by a thermistor, but not limited thereto. In an embodiment, the cooling device 104 includes a fan 126 and a thermoelectric cooler 128. The cooling device 104 is suitable for cooling a target element 108 of the projector 10. The target element 108 includes at least one of the light source module 116 and the light valve 118, in which the cold side of the thermoelectric cooler 128 is coupled to the target element 108, such as being coupled to the light valve 118. In other embodiments, the target element 108 may be other elements in the projector 10 that need heat dissipation, and is not limited to the above-mentioned ones.

The control circuit 100 may generate a control signal SC1 to the cooling device 104 according to the ambient temperature sensing signal S1 and a brightness setting signal SL1 of the projector 10 when the projector 10 is in the brightness adjustment mode, so that the cooling device 104 may adjust the temperature regulation operation performed on the target element 108 according to the control signal SC1. In this embodiment, the brightness adjustment mode refers to a mode in which the brightness is adjusted and changed by the user, such as a custom brightness mode. The brightness setting signal SL1 is generated after the user operates the setting in the brightness adjustment mode. The brightness of the projector 10 corresponding to the brightness setting signal SL1 may be related to the percentage of the highest driving current or the highest driving power of the projector 10, and may also be related to the brightness value set by the user on the operating interface of the projector 10, and is not limited thereto. The temperature regulation operation is, for example, adjusting the rotation speed of the fan 126 or changing the cold side temperature of the thermoelectric cooler 128. In this way, by the temperature regulation operation of adjusting the cooling device 104 according to the ambient temperature and the brightness set by the user, condensation can be prevented from occurring, thereby preventing the projector 10 from malfunctioning or being damaged.

Furthermore, the control circuit 100 is implemented by, for example, a processor. As shown in FIG. 1, the control circuit 100 may include a control unit 110, an operation determination unit 112, and a storage unit 114, in which the control unit 110 is electrically connected to the cooling device 104 and is suitable for generating the control signal SC1 to control the temperature regulation operation performed by the cooling device 104 on the target element 108. The operation determination unit 112 is suitable for calculating the rotation speed of the fan 126 or the cold side temperature range of the thermoelectric cooler 128 used as the target parameter value according to the ambient temperature sensing signal S1 and the brightness setting signal SL1. The storage unit 114 is suitable for storing relevant data required by the operation determination unit 112 when performing the calculation.

Figure 2:
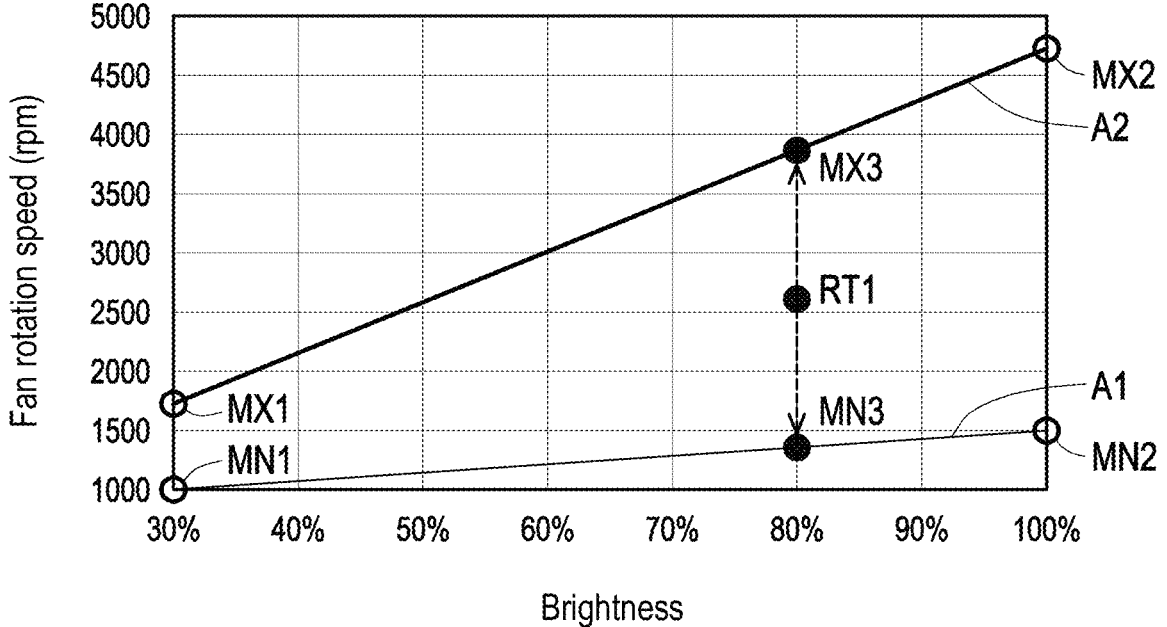
FIG. 2 is a schematic diagram of a relationship between a rotation speed of a fan and a brightness of the projector according to an embodiment of the disclosure.

Please refer to the schematic diagram of the relationship between the rotation speed of the fan and the brightness of the projector as shown in FIG. 2. For example, the storage unit 114 stores a first pre-determined fan rotation speed MN1 corresponding to the first pre-determined brightness of the projector 10 and a second pre-determined fan rotation speed MN2 corresponding to the second pre-determined brightness of the projector 10 when the ambient temperature is at the first pre-determined ambient temperature. The storage unit 114 also stores a third pre-determined fan rotation speed MX1 corresponding to the first pre-determined brightness of the projector 10 and a fourth pre-determined fan rotation speed MX2 corresponding to the second pre-determined brightness of the projector 10 when the ambient temperature is at the second pre-determined ambient temperature. In this embodiment, the first pre-determined ambient temperature is 28° C., the second pre-determined ambient temperature is 40° C., the first pre-determined brightness is 30% brightness, and the second pre-determined brightness is 100% brightness, but are not limited thereto, as long as the ambient temperature is between the first pre-determined ambient temperature and the second pre-determined ambient temperature, and the brightness corresponding to the brightness setting signal SL1 is between the first pre-determined brightness and the second pre-determined brightness. In addition, the afore-mentioned expression of the brightness using numerical % brightness represents the brightness generated based on the numeric percentage of the highest driving current or the highest driving power of the projector 10 to drive the light source module 116. For example, the first pre-determined brightness is 30% brightness, which means that this brightness is based on 30% of the highest driving current or the highest driving power of the projector 10 to drive the light source module 116, and the second pre-determined brightness is 100% brightness, which means that this brightness is based on the highest driving current or the highest driving power of the projector 10 to drive the light source module 116.

The operation determination unit 112 may calculate the target parameter value of the rotation speed of the fan 126 of the projector 10 under the ambient temperature and the brightness setting signal according to the ambient temperature sensing signal S1 from the thermal sensor 102, the brightness setting signal SL1 generated after the user operates the setting, the first pre-determined ambient temperature, the second pre-determined ambient temperature, the first pre-determined brightness, the second pre-determined brightness, the first pre-determined fan rotation speed MN1, the second pre-determined fan rotation speed MN2, the third pre-determined fan rotation speed MX1, and the fourth pre-determined fan rotation speed MX2 from the storage unit 114. For example, assuming that the ambient temperature corresponding to the ambient temperature sensing signal S1 is between the first pre-determined ambient temperature and the second pre-determined ambient temperature, taking the ambient temperature as 34° C. as an example, the brightness of the projector 10 corresponding to the brightness setting signal SL1 is 80% brightness. The operation determination unit 112 may first calculate a first function relationship (Curve A1 as shown in FIG. 2) between the rotation speed of the fan 126 and the brightness of the projector 10 at the first pre-determined ambient temperature according to the first pre-determined brightness, the first pre-determined fan rotation speed MN1, the second pre-determined brightness, and the second pre-determined fan rotation speed MN2. The operation determination unit 112 may further calculate a second function relationship (Curve A2 as shown in FIG. 2) between the rotation speed of the fan 126 and the brightness of the projector 10 at the second pre-determined ambient temperature according to the first pre-determined brightness, the third pre-determined fan rotation speed MX1, the second pre-determined brightness, and the fourth pre-determined fan rotation speed MX2. Afterward, a first fan rotation speed MN3 corresponding to the brightness setting signal SL1 at the first pre-determined ambient temperature is calculated by interpolation according to the first function relationship and the brightness corresponding to the brightness setting signal SL1 (in this embodiment is 80% brightness), and a second fan rotation speed MX3 corresponding to the brightness setting signal SL1 at the second pre-determined ambient temperature is calculated by interpolation according to the second function relationship and the brightness corresponding to the brightness setting signal SL1 (in this embodiment is 80% brightness). In this way, the operation determination unit 112 may perform interpolation calculation to obtain a target parameter value RT1 of the rotation speed of the fan 126 according to the first pre-determined ambient temperature, the second pre-determined ambient temperature, the ambient temperature corresponding to the ambient temperature sensing signal S1, the first fan rotation speed MN3, and the second fan rotation speed MX3. The control unit 110 may generate the control signal SC1 according to the target parameter value RT1, so as to control the rotation speed of the fan 126 to be close to the target parameter value RT1.

In an embodiment, the storage unit 114 may store multiple first pre-determined fan rotation speeds MN1, second pre-determined fan rotation speeds MN2, third pre-determined fan rotation speeds MX1, and fourth pre-determined fan rotation speeds MX2 corresponding to different fans as shown in FIG. 4 in advance, and then the operation determination unit 112 obtains the required information by a table lookup method to perform calculation. However, in other embodiments, the first function relationship and the second function relationship as shown in FIG. 3 may also be stored in the storage unit 114 in advance, and the operation determination unit 112 obtains the first function relationship and the second function relationship by the table lookup method, and then substitutes the brightness setting signal into the first function relationship and the second function relationship respectively to obtain the first fan rotation speed MN3 and the second fan rotation speed MX3. As shown in FIG. 3, in the first function relationship, (rpm min, i) represents the fan rotation speed (such as the rotation speed per minute) corresponding to the brightness i at the first pre-determined ambient temperature, and in the second function relationship, (rpm max, i) represents the fan rotation speed corresponding to the brightness i at the second pre-determined ambient temperature, in which the value of the brightness i is the brightness value set by the user on the operating interface of the projector. In this embodiment, when the brightness $i=1$, the brightness corresponding to the projector 10 is 30% brightness. When the brightness $i=100$, the brightness corresponding to the projector 10 is 100% brightness, and the operation determination unit 112 may obtain the corresponding i value according to the brightness of the projector 10 corresponding to the brightness setting signal SL1. In this embodiment, when the ambient temperature Ta corresponding to the ambient temperature sensing signal S1 is less than 28° C., the operation determination unit 112 sets the fan rotation speed to (rpm min, i). When the ambient temperature Ta corresponding to the ambient temperature sensing signal S1 is from 28° C. to 40° C., the calculation formula (rpm min, i)+G*(Ta−28) as shown in FIG. 3 may be used, in which G=[(rpm max, i)−(rpm min, i)]/(40−28), when the ambient temperature Ta corresponding to the ambient temperature sensing signal S1 is greater than 40° C., the operation determination unit 112 sets the fan rotation speed to (rpm max, i).

Referring to FIG. 4, the fan 126 includes fans F1 to F5, and different fans F1 to F5 may have, for example, corresponding first pre-determined fan rotation speeds MN1, second pre-determined fan rotation speeds MN2, third pre-determined fan rotation speeds MX1, and fourth pre-determined fan rotation speeds MX2 respectively, according to different placement positions or specifications. For example, the first pre-determined fan rotation speed MN1, the second pre-determined fan rotation speed MN2, the third pre-determined fan rotation speed MX1, and the fourth pre-determined fan rotation speed MX2 of the fan F1 are respectively 1000×α, 1500×α, 1700×α, and 4700×α, in which the weight value a may, for example, be related to the placement manner of the projector 10 or the air pressure of the environment where the projector 10 is located. For example, when the temperature control module 100 includes an air pressure sensor (not shown) coupled to the control circuit 106, the control circuit 106 may adjust the first pre-determined fan rotation speed MN1, the second pre-determined fan rotation speed MN2, the third pre-determined fan rotation speed MX1, and the fourth pre-determined fan rotation speed MX2 of the fan according to the air pressure sensed by the air pressure sensor, and then adjust the target parameter value of the calculated fan rotation speed, so that the rotation speed of the fan 126 can change in response to the air pressure of the environment where the projector 10 is located. For example, the air pressure corresponding to different altitudes is different, and the weight value a may also be changed accordingly. For example, when the altitudes are respectively 0, 2000, 4000, and 10,000 feet, the weight value a may sequentially be 1, 1.09, 1.19, and 1.67. In addition, when the temperature control module 100 includes a direction detector (such as a gyroscope, but not limited thereto) coupled to the control circuit 106, the control circuit 106 may determine the placement manner of the projector 10 according to the detecting result of the direction detector (for example, the placement being forward projection or upward projection), adjust the first pre-determined fan rotation speed MN1, the second pre-determined fan rotation speed MN2, the third pre-determined fan rotation speed MX1, and the fourth pre-determined fan rotation speed MX2 of the fan 126 according to the placement manner of the projector 10, and then adjust the target parameter value of the calculated fan rotation speed, so that the rotation speed of the fan 126 can change in response to the placement manner of the projector 10.

In addition, the temperature sensor 124 may sense the cold side temperature of the thermoelectric cooler 128 to generate a cold side temperature sensing signal S2, and the storage unit 114 of the control circuit 106 may also store multiple function relationships between the corresponding upper limit temperature and lower limit temperature of the cold side of the thermoelectric cooler 128 and the brightness of the projector 10 when the ambient temperature is respectively within the first pre-determined ambient temperature range and the second pre-determined ambient temperature range. In this embodiment, the minimum scale of the temperature sensed by the thermal sensor 102 is 1° C. The multiple function relationships may include, as shown in FIG. 5, a third function relationship (that is, the target upper limit value=−0.14i+54) calculated according to the first upper limit value of the cold side temperature (i.e., 54° C.) of the thermoelectric cooler 128 corresponding to the first pre-determined brightness (i.e., the brightness i=1) of the projector 10 and the second upper limit value of the cold side temperature of the thermoelectric cooler 128 (i.e., 40° C.) corresponding to the second pre-determined brightness (i.e., the brightness i=100) of the projector 10 when the ambient temperature Ta is within the first pre-determined ambient temperature range (i.e., the ambient temperature Ta is less than or equal to 36° C.), a fourth function relationship (that is, the target lower limit value=−0.14i+52) calculated according to the first lower limit value of the cold side temperature (i.e., 52° C.) of the thermoelectric cooler 128 corresponding to the first pre-determined brightness (i.e., the brightness i=1) of the projector 10 and the second lower limit value of the cold side temperature (i.e., 38° C.) of the thermoelectric cooler 128 corresponding to the second pre-determined brightness (i.e., the brightness i=100) of the projector 10 when the ambient temperature Ta is within the first pre-determined ambient temperature range (i.e., the ambient temperature Ta is less than or equal to 36° C.), a fifth function relationship (that is, the target upper limit value=−0.08i+54) calculated according to the third upper limit value (i.e., 54° C.) of the cold side temperature of the thermoelectric cooler 128 corresponding to the first pre-determined brightness (i.e., the brightness i=1) of the projector 10 and the fourth upper limit value of the cold side temperature (i.e., 46° C.) of the thermoelectric cooler 128 corresponding to the second pre-determined brightness (i.e., the brightness i=100) of the projector 10 when the ambient temperature is within the second pre-determined ambient temperature range (i.e., the ambient temperature Ta is between 37 to 41° C.), and a sixth function relationship (that is, the target lower limit value=−0.08i+52) calculated according to the third lower limit value of the cold side temperature (i.e., 52° C.) of the thermoelectric cooler 128 corresponding to the first pre-determined brightness (the brightness i=1) of the projector 10 and the fourth lower limit value of the cold side temperature (i.e., 44° C.) of the thermoelectric cooler 128 corresponding to the second pre-determined brightness (i.e., the brightness i=100) of the projector 10 when the ambient temperature is within the second pre-determined ambient temperature range (i.e., when the ambient temperature Ta is between 37 to 41° C.). The values of the first pre-determined ambient temperature range, the second pre-determined ambient temperature range, the first pre-determined brightness, and the second pre-determined brightness are just examples of the embodiments, but are not limited thereto, as long as the brightness of the projector 10 corresponding to the brightness setting signal SL1 is between the first pre-determined brightness and the second pre-determined brightness, and the ambient temperature Ta falls within the first pre-determined ambient temperature range or the second pre-determined ambient temperature range.

The operation determination unit 112 may find out the function relationship corresponding to the ambient temperature Ta according to the ambient temperature sensing signal S1, and calculate the target parameter value of the cold side temperature of the thermoelectric cooler 128 according to the brightness setting signal SL1 and the found function relationship, in which the target parameter value is the range value defined by the target upper limit value and the target lower limit value. For example, assuming that the brightness i=15 corresponding to the brightness setting signal SL1 and the ambient temperature Ta=30° C. corresponding to the ambient temperature sensing signal S1, the operation determination unit 112 may substitute the brightness i=15 into the function relationship: target upper limit value=−0.14i+54 and target lower limit value=−0.14i+52 to obtain the target parameter value defined by the target upper limit value 51.9° C. and the target lower limit value 49.9° C.

The control unit 110 may generate the control signal SC1 according to the calculated target parameter value and the cold side temperature sensing signal S2, so as to control the current or power provided to the thermoelectric cooler 128. For example, when the cold side temperature corresponding to the cold side temperature sensing signal S2 is lower than the target lower limit value, the control unit 110 decreases the current or power provided to the thermoelectric cooler 128, and when the cold side temperature corresponding to the cold side temperature sensing signal S2 is higher than the target upper limit value, the control unit 110 increases the current or power provided to the thermoelectric cooler 128. Taking the above-mentioned target upper limit value 51.9° C. and the target lower limit value 49.9° C. as an example, when the cold side temperature corresponding to the cold side temperature sensing signal S2 is lower than the target lower limit value 49.9° C., the control unit 110 decreases the current or power provided to the thermoelectric cooler 128, and when the cold side temperature corresponding to the cold side temperature sensing signal S2 is higher than the target upper limit value 51.9° C., the control unit 110 increases the current or power provided to the thermoelectric cooler 128. In this way, condensation can be prevented from occurring, thereby preventing the projector 10 from malfunctioning or being damaged.

It should be noted that, in the above embodiment, the corresponding function relationship is first determined according to the ambient temperature Ta, and then the brightness i is substituted into the function relationship to calculate the target upper limit value and the target lower limit value. In other embodiments, the brightness i may also be first substituted into the function relationship corresponding to different pre-determined ambient temperature ranges, and then the target upper limit value and the target lower limit value to be used are determined according to the ambient temperature Ta. In addition, in some embodiments, the temperature control module 100 may further include a humidity sensor coupled to the control circuit 106. The control circuit 106 may adjust the target parameter value of the cold side temperature of the thermoelectric cooler 128 according to the humidity sensed by the humidity sensor, that is, to adjust the target upper limit value and the target lower limit value according to the humidity sensed by the humidity sensor, so as to further prevent condensation from occurring. In addition, the above-mentioned tables in FIG. 3 to FIG. 5 are only exemplary embodiments and are not limited thereto. For example, the storage unit 114 may store tables corresponding to different brightnesses and ambient temperatures, and the operation determination unit 112 may select the corresponding table to calculate the fan rotation speed and the control temperature of the cold side of the thermoelectric cooler 128 according to the ambient temperature sensing signal S1 and the brightness setting signal SL1.

Figure 6:
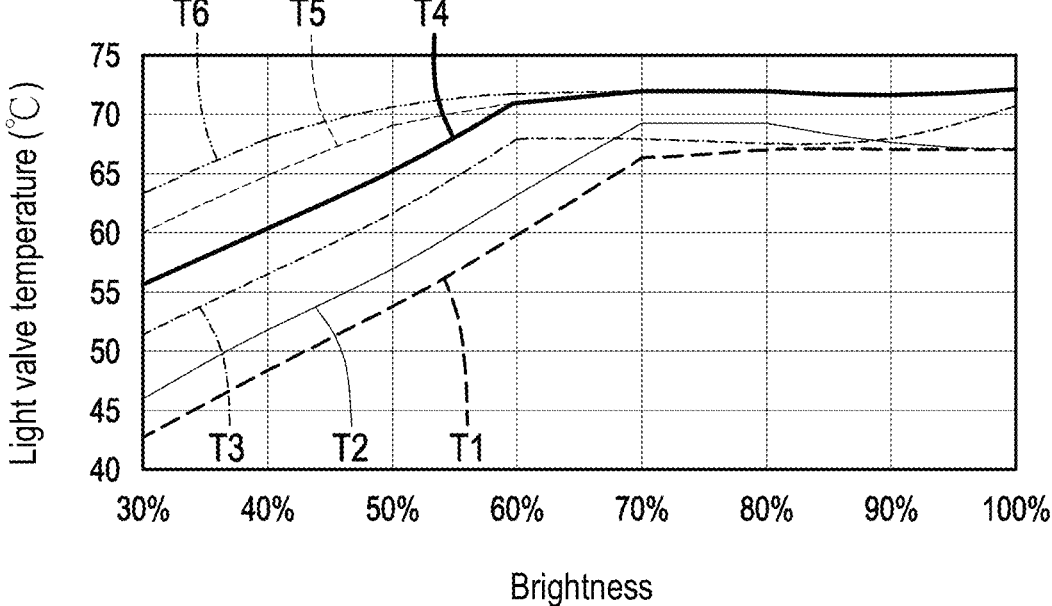
FIG. 6 is a schematic diagram of a light valve temperature control result according to an embodiment of the disclosure.
Figure 7:
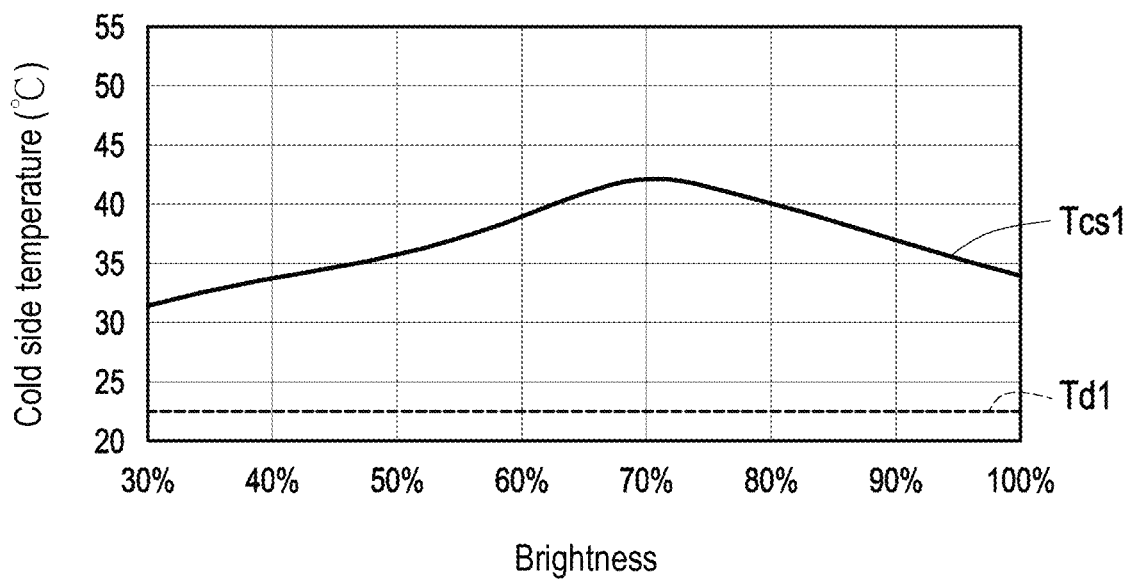
FIG. 7 and FIG. 8 are schematic diagrams of cold side temperatures of the thermoelectric cooler according to an embodiment of the disclosure.
Figure 8:
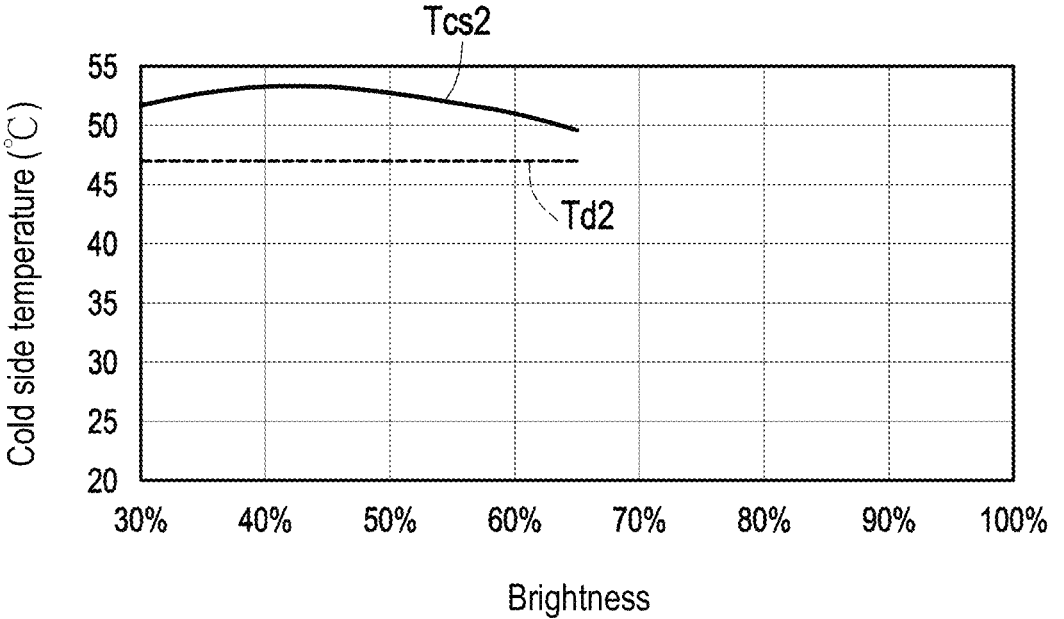

As shown in FIG. 6, under the conditions of the brightness of the projector and various ambient temperatures, through the fan control and the cold side temperature control of the thermoelectric cooler 128 of the above embodiment, the temperature of the light valve 118 can be made to meet the specifications. Curves T1 to T6 respectively represent the relationship between the light valve temperature and the brightness under different temperature conditions. For example, in the Curve T1, the ambient temperature is 25° C. and the maximum temperature of the light valve 118 is 67° C. In the Curve T6, the ambient temperature is 50° C. and the maximum temperature of the light valve 118 is 72° C. In addition, as shown in FIG. 7, when the ambient temperature is 25° C., a cold side temperature Tes1 of the thermoelectric cooler 128 is greater than a dew point temperature Td1, which means that no condensation occurs on the light valve 118. As another example, as shown in FIG. 8, when the ambient temperature is 50° C., a cold side temperature Tcs2 of the thermoelectric cooler 128 is greater than a dew point temperature Td2, which also means that no condensation occurs on the light valve 118.

Figure 9:
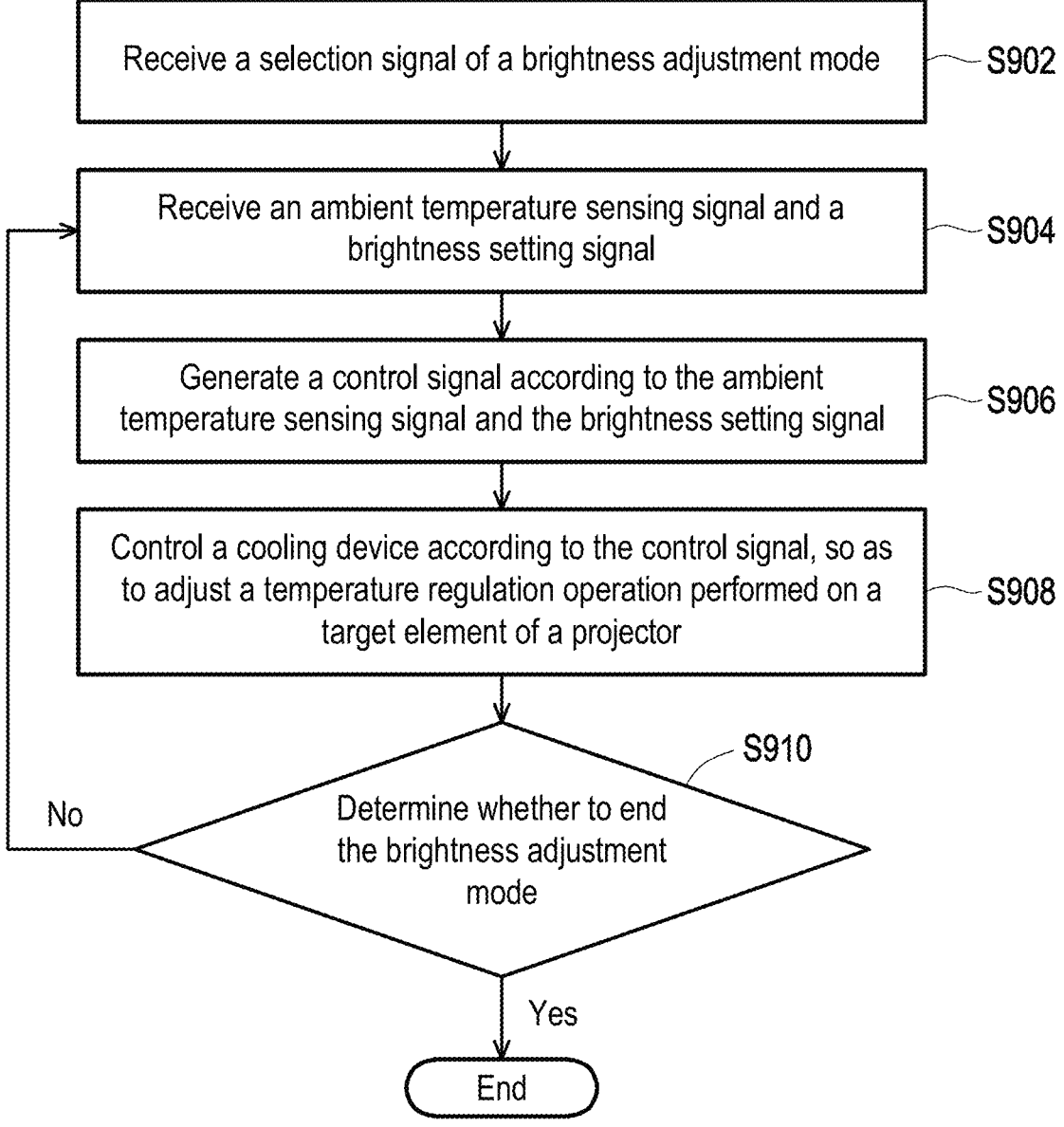
FIG. 9 is a flowchart of a temperature control method according to an embodiment of the disclosure.

FIG. 9 is a flowchart of a temperature control method suitable for a projector according to an embodiment of the disclosure. It may be seen from the above embodiments that, the temperature control method may include at least the following steps. Firstly, a selection signal of a brightness adjustment mode is received (Step S902), in which the selection signal is generated in response to a command which the user selects to enter the brightness mode through the operating interface, so that the projector enters a mode that the brightness can be adjusted and changed by the user. Next, the ambient temperature sensing signal generated by the thermal sensor corresponding to the ambient temperature and the brightness setting signal generated by the user through operating the setting are received (Step S904), in which the ambient temperature sensing signal and the brightness setting signal may be received simultaneously or received sequentially, and the receiving sequence is not limited. Then, a control signal is generated according to the ambient temperature sensing signal and the brightness setting signal (Step S906), and the cooling device is controlled according to the control signal, so as to adjust the temperature regulation operation performed on the target element of the projector (Step S908). In an example, the target element includes at least one of the light source module and the light valve, but is not limited thereto. The cooling device includes at least one of the fan and the thermoelectric cooler, the cold side of the thermoelectric cooler may be coupled to the target element, for example, coupled to the light valve, and the control signal is suitable for controlling at least one of the rotation speed of the fan and the temperature of the cold side of the thermoelectric cooler. The temperature regulation operation is, for example, adjusting the rotation speed of the fan or changing the cold side temperature of the thermoelectric cooler. Finally, whether to end the brightness adjustment mode is determined (Step S910). In an embodiment, the determination may be according to whether an end signal to end the brightness adjustment mode or a selection signal to switch to other modes (such as a normal mode or an economic mode, but not limited thereto, in which in the general mode or the economic mode value, the brightness of the projector, the rotation speed of the fan, and the set temperature of the thermoelectric cooler are fixed values) is received. If it is determined to end the brightness adjustment mode, the temperature control method may be ended, and if it is determined that the brightness adjustment mode is not ended, return to Step S904 and continue to perform the temperature control method. In an embodiment, after returning to Step S904, a time period to re-perform may be pre-determined, the pre-determined time period is, for example, 10 seconds, but not limited thereto.

Further, the above temperature control method may be illustrated by taking controlling the fan rotation speed as an example. As shown in FIG. 10, four pre-determined fan rotation speeds corresponding to two different pre-determined brightnesses at two different pre-determined ambient temperatures are read first (Step S1002), that is, the first pre-determined fan rotation speed, the second pre-determined fan rotation speed, the third pre-determined fan rotation speed and the fourth pre-determined fan rotation speed are read. The first pre-determined fan rotation speed is corresponding to the first pre-determined brightness of the projector and the second pre-determined fan rotation speed is corresponding to the second pre-determined brightness of the projector when the ambient temperature is at the first pre-determined ambient temperature, and the third pre-determined fan rotation speed is corresponding to the first pre-determined brightness of the projector and the fourth pre-determined fan rotation speed is corresponding to the second pre-determined brightness of the projector when the ambient temperature is at the second pre-determined ambient temperature. Then, the function relationship between the fan rotation speed and the brightness of the projector at two different pre-determined ambient temperatures may be calculated according to the four pre-determined fan rotation speeds (Step S1004). For example, the first function relationship between the fan rotation speed and the brightness of the projector corresponding to the first pre-determined ambient temperature may be calculated according to the first pre-determined brightness, the second pre-determined brightness, the first pre-determined fan rotation speed, and the second pre-determined fan rotation speed. Also, the second function relationship between the fan rotation speed and the brightness of the projector corresponding to the second pre-determined ambient temperature may be calculated according to the first pre-determined brightness, the second pre-determined brightness, the third pre-determined fan rotation speed, and the fourth pre-determined fan rotation speed.

Afterward, the target parameter value of the rotation speed of the fan is calculated according to the ambient temperature sensing signal, the brightness setting signal, the pre-determined ambient temperature, and the function relationship (Step S1006). For example, the target parameter value of the fan rotation speed under the current ambient temperature and the brightness setting signal may be calculated according to the ambient temperature sensing signal, the brightness setting signal, the first pre-determined ambient temperature, the second pre-determined ambient temperature, the first pre-determined brightness, the second pre-determined brightness, the first pre-determined fan rotation speed, the second pre-determined fan rotation speed, the third pre-determined fan rotation speed, and the fourth pre-determined fan rotation speed. Furthermore, the first fan rotation speed corresponding to the brightness setting signal at the first pre-determined ambient temperature may be calculated according to the first function relationship and the brightness setting signal, and the second fan rotation speed corresponding to the brightness setting signal at the second pre-determined ambient temperature may be calculated according to the second function relationship and the brightness setting signal. Then, the target parameter value of the fan rotation speed may be calculated according to the first pre-determined ambient temperature, the second pre-determined ambient temperature, the ambient temperature sensing signal, the first fan rotation speed, and the second fan rotation speed. The ambient temperature corresponding to the ambient temperature sensing signal is between the first pre-determined ambient temperature and the second pre-determined ambient temperature, and the brightness of the projector corresponding to the brightness setting signal is between the first pre-determined brightness and the second pre-determined brightness. Finally, a control signal is generated according to the target parameter value, so as to control the fan rotation speed (Step S1008), so that the fan rotation speed is close to the target parameter value. In some embodiments, the target parameter value may be further adjusted according to the air pressure and the placement manner of the projector, thereby adjusting the rotation speed of the fan, so as to accurately perform the temperature control method.

In addition, the above temperature control method may be illustrated by taking controlling the cold side temperature of the thermoelectric cooler as an example. As shown in FIG. 11, a cold side temperature sensing signal corresponding to the cold side temperature of the thermoelectric cooler is first received (Step S1102), in which the cold side temperature sensing signal may be generated by the temperature sensor through sensing. Then, multiple function relationships are read, in which the multiple function relationships are between the corresponding upper limit temperature and lower limit temperature of the cold side of the thermoelectric cooler and the brightness of the projector when the ambient temperature is respectively within the first pre-determined ambient temperature range and the second pre-determined ambient temperature range (Step S1104). The multiple function relationships include the third function relationship calculated according to the first upper limit value of the cold side temperature of the thermoelectric cooler corresponding to the first pre-determined brightness of the projector and the second upper limit value of the cold side temperature of the thermoelectric cooler corresponding to the second pre-determined brightness of the projector when the ambient temperature is within the first pre-determined ambient temperature range, the fourth function relationship calculated according to the first lower limit value of the cold side temperature of the thermoelectric cooler corresponding to the first pre-determined brightness of the projector and the second lower limit value of the cold side temperature of the thermoelectric cooler corresponding to the second pre-determined brightness of the projector when the ambient temperature is within the first pre-determined ambient temperature range, the fifth function relationship calculated according to the third upper limit value of the cold side temperature of the thermoelectric cooler corresponding to the first pre-determined brightness of the projector and the fourth upper limit value of the cold side temperature of the thermoelectric cooler corresponding to the second pre-determined brightness of the projector when the ambient temperature is within the second pre-determined ambient temperature range, and the sixth function relationship calculated according to the third lower limit value of the cold side temperature of the thermoelectric cooler corresponding to the first pre-determined brightness of the projector and the fourth lower limit of the cold side temperature of the thermoelectric cooler corresponding to the second pre-determined brightness of the projector when the ambient temperature is within the second pre-determined ambient temperature range. The brightness of the projector corresponding to the brightness setting signal is between the first pre-determined brightness and the second pre-determined brightness.

Afterward, the target parameter value of the cold side temperature is calculated according to the ambient temperature sensing signal, the brightness setting signal, and the function relationship between the upper limit temperature and lower limit temperature of the cold side of the thermoelectric cooler and the brightness of the projector (Step S1106). For example, the function relationship corresponding to the current ambient temperature may be found according to the ambient temperature sensing signal, and the target parameter value of the cold side temperature of the thermoelectric cooler may be calculated according to the brightness setting signal and the function relationship, in which the current ambient temperature falls within the first pre-determined ambient temperature range or the second pre-determined ambient temperature range.

Afterward, a control signal is generated according to the cold side temperature sensing signal and the target parameter value of the cold side temperature, so as to control the current or power provided to the thermoelectric cooler (Step S1108). Furthermore, the target parameter value has a target upper limit value and a target lower limit value, and a method of controlling the current or power provided to the thermoelectric cooler may be, for example, the current or power provided to the thermoelectric cooler is decreased when the cold side temperature corresponding to the cold side temperature sensing signal is lower than the target lower limit value, and the current or power provided to the thermoelectric cooler is increased when the cold side temperature corresponding to the cold side temperature sensing signal is higher than the target upper limit value. In some embodiments, the target parameter value may also be adjusted according to the humidity, that is, the target upper limit value and the target lower limit value may be adjusted, the current or power provided to the thermoelectric cooler may be adjusted, and thereby changing the cold side temperature of the thermoelectric cooler, so as to accurately perform the temperature control method.

In summary, the embodiments of the disclosure may generate a control signal to the cooling device according to the ambient temperature sensing signal from the thermal sensor and in response to the brightness setting signal operated by the user when the projector is in the brightness adjustment mode, so as to control the cooling device to adjust the temperature regulation operation performed on the target element. In this way, by the temperature regulation operation of adjusting the cooling device as changes of the ambient temperature and the brightness of the projector, condensation can be prevented from occurring, thereby preventing the projector from malfunctioning or being damaged.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A temperature control module suitable for a projector, comprising:
   a thermal sensor disposed on the projector, wherein the thermal sensor is suitable for sensing an ambient temperature to generate an ambient temperature sensing signal;
   a cooling device disposed on the projector and suitable for cooling a target element of the projector; and
   a control circuit coupled to the thermal sensor and the cooling device, wherein the control circuit generates a control signal to the cooling device according to the ambient temperature sensing signal from the thermal sensor and a brightness setting signal of the projector in response to the projector being in a brightness adjustment mode, and the cooling device adjusts a temperature regulation operation performed on the target element according to the control signal,
   wherein the brightness setting signal is generated after a brightness is set by an user operation in the brightness adjustment mode.

2. The temperature control module as claimed in claim 1, wherein the cooling device comprises at least one of a fan and a thermoelectric cooler, a cold side of the thermoelectric cooler is coupled to the target element, and the control signal is suitable for controlling at least one of a rotation speed of the fan and a temperature of the cold side of the thermoelectric cooler.

3. The temperature control module as claimed in claim 1, wherein the cooling device comprises a fan, and the control circuit is suitable for:
   storing a first pre-determined fan rotation speed corresponding to a first pre-determined brightness of the projector and a second pre-determined fan rotation speed corresponding to a second pre-determined brightness of the projector in response to the ambient temperature being at a first pre-determined ambient temperature, and a third pre-determined fan rotation speed corresponding to the first pre-determined brightness of the projector and a fourth pre-determined fan rotation speed corresponding to the second pre-determined brightness of the projector in response to the ambient temperature being at a second pre-determined ambient temperature;
   calculating a target parameter value of a rotation speed of the fan under the ambient temperature and the brightness setting signal according to the ambient temperature sensing signal, the brightness setting signal, the first pre-determined ambient temperature, the second pre-determined ambient temperature, the first pre-determined brightness, the second pre-determined brightness, the first pre-determined fan rotation speed, the second pre-determined fan rotation speed, the third pre-determined fan rotation speed, and the fourth pre-determined fan rotation speed; and
   generating the control signal according to the target parameter value, so as to control the rotation speed of the fan to be close to the target parameter value,
   wherein the ambient temperature corresponding to the ambient temperature sensing signal is between the first pre-determined ambient temperature and the second pre-determined ambient temperature, and a brightness of the projector corresponding to the brightness setting signal is between the first pre-determined brightness and the second pre-determined brightness.

4. The temperature control module as claimed in claim 3, wherein the control circuit is further suitable for:

calculating a first function relationship between the rotation speed of the fan and the brightness of the projector corresponding to the first pre-determined ambient temperature according to the first pre-determined brightness, the second pre-determined brightness, the first pre-determined fan rotation speed, and the second pre-determined fan rotation speed;

calculating a second function relationship between the rotation speed of the fan and the brightness of the projector corresponding to the second pre-determined ambient temperature according to the first pre-determined brightness, the second pre-determined brightness, the third pre-determined fan rotation speed, and the fourth pre-determined fan rotation speed;

calculating a first fan rotation speed corresponding to the brightness setting signal at the first pre-determined ambient temperature according to the first function relationship and the brightness setting signal;

calculating a second fan rotation speed corresponding to the brightness setting signal at the second pre-determined ambient temperature according to the second function relationship and the brightness setting signal; and calculating the target parameter value of the rotation speed of the fan according to the first pre-determined ambient temperature, the second pre-determined ambient temperature, the ambient temperature sensing signal, the first fan rotation speed, and the second fan rotation speed.

5. The temperature control module as claimed in claim 1, wherein the cooling device comprises a thermoelectric cooler, and the temperature control module further comprises a temperature sensor suitable for sensing a cold side temperature of the thermoelectric cooler to generate a cold side temperature sensing signal, and the control circuit is suitable for:

storing a plurality of function relationships between an upper limit temperature and a lower limit temperature of a cold side of the thermoelectric cooler and a brightness of the projector in response to the ambient temperature being respectively within the first pre-determined ambient temperature range and the second pre-determined ambient temperature range;

finding out the function relationship corresponding to the ambient temperature according to the ambient temperature sensing signal and calculating a target parameter value of the cold side temperature of the thermoelectric cooler according to the brightness setting signal and the function relationship; and generating the control signal according to the target parameter value and the cold side temperature sensing signal, so as to control a current or a power provided to the thermoelectric cooler, wherein the ambient temperature falls within the first pre-determined ambient temperature range or the second pre-determined ambient temperature range.

6. The temperature control module as claimed in claim 5, wherein the function relationship comprises:

a third function relationship calculated according to a first upper limit value of the cold side temperature of the thermoelectric cooler corresponding to the first pre-determined brightness of the projector and a second upper limit value of the cold side temperature of the thermoelectric cooler corresponding to the second pre-determined brightness of the projector in response to the ambient temperature being within the first pre-determined ambient temperature range, a fourth function relationship calculated according to a first lower limit value of the cold side temperature of the thermoelectric cooler corresponding to the first pre-determined brightness of the projector and a second lower limit value of the cold side temperature of the thermoelectric cooler corresponding to the second pre-determined brightness of the projector in response to the ambient temperature being within the first pre-determined ambient temperature range, a fifth function relationship calculated according to a third upper limit value of the cold side temperature of the thermoelectric cooler corresponding to the first pre-determined brightness of the projector and a fourth upper limit value of the cold side temperature of the thermoelectric cooler corresponding to the second pre-determined brightness of the projector in response to the ambient temperature being within the second pre-determined ambient temperature range, and a sixth function relationship calculated according to a third lower limit value of the cold side temperature of the thermoelectric cooler corresponding to the first pre-determined brightness of the projector and a fourth lower limit value of the cold side temperature of the thermoelectric cooler corresponding to the second pre-determined brightness of the projector in response to the ambient temperature being within the second pre-determined ambient temperature range, wherein the brightness of the projector corresponding to the brightness setting signal is between the first pre-determined brightness and the second pre-determined brightness.

7. The temperature control module as claimed in claim 5, wherein the target parameter value of the cold side temperature of the thermoelectric cooler has a target upper limit value and a target lower limit value, the control circuit decreases the current or the power provided to the thermoelectric cooler in response to the cold side temperature corresponding to the cold side temperature sensing signal being lower than the target lower limit value, and the control circuit increases the current or the power provided to the thermoelectric cooler in response to the cold side temperature corresponding to the cold side temperature sensing signal being higher than the target upper limit value.

8. The temperature control module as claimed in claim 5, further comprising:

a humidity sensor coupled to the control circuit, wherein the control circuit adjusts the target parameter value of the cold side temperature of the thermoelectric cooler according to a humidity sensed by the humidity sensor.

9. The temperature control module as claimed in claim 1, wherein the cooling device comprises a fan, the control signal is suitable for controlling a rotation speed of the fan, and the temperature control module further comprises:

a direction detector coupled to the control circuit to detect a placement manner of the projector, wherein the control circuit adjusts a rotation speed of the fan according to the placement manner of the projector.

10. The temperature control module as claimed in claim 1, wherein the cooling device comprises a fan, the control signal is suitable for controlling a rotation speed of the fan, and the temperature control module further comprises:

an air pressure sensor coupled to the control circuit, and the control circuit adjusts the rotation speed of the fan according to an air pressure sensed by the air pressure sensor.

11. A temperature control method suitable for a projector, comprising:

receiving a selection signal of a brightness adjustment mode;

generating a brightness setting signal after a brightness is set by an user operation in the brightness adjustment mode;

receiving an ambient temperature sensing signal and the brightness setting signal;

generating a control signal according to the ambient temperature sensing signal and the brightness setting signal;

controlling a cooling device according to the control signal, so as to adjust a temperature regulation operation performed on a target element of the projector; and determining whether to end the brightness adjustment mode, repeatedly returning to receive the ambient temperature sensing signal and the brightness setting signal in response to a determination result being no, and ending the temperature control method in response to the determination result being yes.

12. The temperature control method as claimed in claim 11, wherein the cooling device comprises at least one of a fan and a thermoelectric cooler, a cold side of the thermoelectric cooler is coupled to the target element, and the control signal is suitable for controlling at least one of a rotation speed of the fan and a temperature of the cold side of the thermoelectric cooler.

13. The temperature control method as claimed in claim 11, wherein the cooling device comprises a fan, and the temperature control method further comprises:

reading a first pre-determined fan rotation speed corresponding to a first pre-determined brightness of the projector and a second pre-determined fan rotation speed corresponding to a second pre-determined brightness of the projector in response to the ambient temperature being at a first pre-determined ambient temperature, and a third pre-determined fan rotation speed corresponding to the first pre-determined brightness of the projector and a fourth pre-determined fan rotation speed corresponding to the second pre-determined brightness of the projector in response to the ambient temperature being at a second pre-determined ambient temperature;

calculating a target parameter value of a rotation speed of the fan under the ambient temperature and the brightness setting signal according to the ambient temperature sensing signal, the brightness setting signal, the first pre-determined ambient temperature, the second pre-determined ambient temperature, the first pre-determined brightness, the second pre-determined brightness, the first pre-determined fan rotation speed, the second pre-determined fan rotation speed, the third pre-determined fan rotation speed, and the fourth pre-determined fan rotation speed; and generating the control signal according to the target parameter value, so as to control the rotation speed of the fan to be close to the target parameter value, wherein the ambient temperature corresponding to the ambient temperature sensing signal is between the first pre-determined ambient temperature and the second pre-determined ambient temperature, and a brightness of the projector corresponding to the brightness setting signal is between the first pre-determined brightness and the second pre-determined brightness.

14. The temperature control method as claimed in claim 13, further comprising:

calculating a first function relationship between the rotation speed of the fan and the brightness of the projector corresponding to the first pre-determined ambient temperature according to the first pre-determined brightness, the second pre-determined brightness, the first pre-determined fan rotation speed, and the second pre-determined fan rotation speed;

calculating a second function relationship between the rotation speed of the fan and the brightness of the projector corresponding to the second pre-determined ambient temperature according to the first pre-determined brightness, the second pre-determined brightness, the third pre-determined fan rotation speed, and the fourth pre-determined fan rotation speed;

calculating a first fan rotation speed corresponding to the brightness setting signal at the first pre-determined ambient temperature according to the first function relationship and the brightness setting signal;

calculating a second fan rotation speed corresponding to the brightness setting signal at the second pre-determined ambient temperature according to the second function relationship and the brightness setting signal; and calculating the target parameter value of the rotation speed of the fan according to the first pre-determined ambient temperature, the second pre-determined ambient temperature, the ambient temperature sensing signal, the first fan rotation speed, and the second fan rotation speed.

15. The temperature control method as claimed in claim 11, wherein the cooling device comprises a thermoelectric cooler, and the temperature control method further comprises:

receiving a cold side temperature sensing signal corresponding to a cold side temperature of the thermoelectric cooler;

reading a plurality of function relationships between an upper limit temperature and a lower limit temperature of a cold side of the thermoelectric cooler and a brightness of the projector in response to the ambient temperature being respectively within the first pre-determined ambient temperature range and the second pre-determined ambient temperature range;

finding out the function relationship corresponding to the ambient temperature according to the ambient temperature sensing signal and calculating a target parameter value of the cold side temperature of the thermoelectric cooler according to the brightness setting signal and the function relationship; and generating the control signal according to the target parameter value and the cold side temperature sensing signal, so as to control a current or a power provided to the thermoelectric cooler, wherein the ambient temperature falls within the first pre-determined ambient temperature range or the second pre-determined ambient temperature range.

16. The temperature control method as claimed in claim 15, wherein the function relationship comprises:

a third function relationship calculated according to a first upper limit value of the cold side temperature of the thermoelectric cooler corresponding to the first pre-determined brightness of the projector and a second upper limit value of the cold side temperature of the thermoelectric cooler corresponding to the second pre-determined brightness of the projector in response to the ambient temperature being within the first pre-determined ambient temperature range, a fourth function relationship calculated according to a first lower limit value of the cold side temperature of the thermoelectric cooler corresponding to the first pre-determined brightness of the projector and a second lower limit value of the cold side temperature of the thermoelectric cooler corresponding to the second pre-determined brightness of the projector in response to the ambient temperature being within the first pre-determined ambient temperature range, a fifth function relationship calculated according to a third upper limit value of the cold side temperature of the thermoelectric cooler corresponding to the first pre-determined brightness of the projector and a fourth upper limit value of the cold side temperature of the thermoelectric cooler corresponding to the second pre-determined brightness of the projector in response to the ambient temperature being within the second pre-determined ambient temperature range, and a sixth function relationship calculated according to a third lower limit value of the cold side temperature of the thermoelectric cooler corresponding to the first pre-determined brightness of the projector and a fourth lower limit value of the cold side temperature of the thermoelectric cooler corresponding to the second pre-determined brightness of the projector in response to the ambient temperature being within the second pre-determined ambient temperature range, wherein the brightness of the projector corresponding to the brightness setting signal is between the first pre-determined brightness and the second pre-determined brightness.

17. The temperature control method as claimed in claim 15, wherein the target parameter value has a target upper limit value and a target lower limit value, and the temperature control method further comprises:

decreasing the current or the power provided to the thermoelectric cooler in response to the cold side temperature corresponding to the cold side temperature sensing signal being lower than the target lower limit value, and increasing the current or the power provided to the thermoelectric cooler in response to the cold side temperature corresponding to the cold side temperature sensing signal being higher than the target upper limit value.

18. The temperature control method as claimed in claim 15, further comprising:

adjusting the target parameter value according to a humidity.

19. The temperature control method as claimed in claim 11, wherein the cooling device comprises a fan, and the temperature control method comprises:

adjusting a rotation speed of the fan according to a placement manner of the projector.

20. The temperature control method as claimed in claim 11, wherein the cooling device comprises a fan, and the temperature control method comprises:

adjusting the rotation speed of the fan according to an air pressure.

* * * * *